(12) United States Patent
Suwabe et al.

(10) Patent No.: US 7,107,763 B2
(45) Date of Patent: Sep. 19, 2006

(54) CERAMIC HONEYCOMB FILTER AND EXHAUST GAS-CLEANING METHOD

(75) Inventors: Hirohisa Suwabe, Fukuoka-ken (JP); Takashi Takakura, Tokyo (JP); Satoshi Makita, Tokyo (JP); Hiroshi Funabashi, Tokyo (JP)

(73) Assignees: Hitachi Metals, Ltd., Tokyo (JP); Hino Motors, Ltd., Tokyo (JP)

( * ) Notice: Subject to any disclaimer, the term of this patent is extended or adjusted under 35 U.S.C. 154(b) by 0 days.

(21) Appl. No.: 10/400,503

(22) Filed: Mar. 28, 2003

(65) Prior Publication Data

US 2004/0047774 A1 Mar. 11, 2004

(30) Foreign Application Priority Data

Mar. 29, 2002 (JP) ............................. 2002-093980
Dec. 24, 2002 (JP) ............................. 2002-372031

(51) Int. Cl.
*F01N 3/00* (2006.01)

(52) U.S. Cl. ............................. 60/295; 60/297; 60/303; 60/311; 55/282.3; 55/524; 55/DIG. 30; 422/177

(58) Field of Classification Search ................. 60/274, 60/286, 295, 297, 303, 311; 55/282.3, 385.3, 55/523, 524, DIG. 30; 422/171, 177, 178
See application file for complete search history.

(56) References Cited

U.S. PATENT DOCUMENTS

| | | | | |
|---|---|---|---|---|
| 4,416,675 A | * | 11/1983 | Montierth | .................... 55/502 |
| 4,419,108 A | * | 12/1983 | Frost et al. | .................... 95/286 |
| 4,420,316 A | * | 12/1983 | Frost et al. | .................... 55/523 |
| 4,519,820 A | | 5/1985 | Oyobe et al. | |
| 4,604,869 A | | 8/1986 | Yoshida et al. | |
| 4,704,863 A | | 11/1987 | Abthoff et al. | |
| 5,100,632 A | | 3/1992 | Dettling et al. | |
| 5,701,735 A | * | 12/1997 | Kawaguchi | .................... 60/274 |
| 6,461,398 B1 | * | 10/2002 | Peters et al. | .................... 55/523 |
| 6,508,852 B1 | * | 1/2003 | Hickman et al. | ............. 55/523 |
| 6,709,489 B1 | * | 3/2004 | Ament et al. | .................. 95/278 |

FOREIGN PATENT DOCUMENTS

| | | |
|---|---|---|
| EP | 0325111 A2 | 7/1989 |
| JP | 04301114 | 10/1992 |
| JP | 04353211 | 12/1992 |
| JP | 2002-122015 A | 4/2002 |
| WO | WO 01/12320 A1 | 2/2001 |

\* cited by examiner

*Primary Examiner*—Binh Q. Tran
(74) *Attorney, Agent, or Firm*—Sughrue Mion, PLLC

(57) ABSTRACT

A ceramic honeycomb filter comprising a ceramic honeycomb structure having porous partition walls defining a plurality of flow paths, and plugs disposed inside the flow paths such that an exhaust gas passes through pores of the porous partition walls, thereby removing particulates from the exhaust gas; a catalyst being carried at least partially on the partition walls and/or the plugs; and at least one of plugs on the side of exhaust gas inlets being disposed at a position separate from the inlet-side opening ends of the flow paths. Particulates are removed from the exhaust gas by injecting unburned fuel and/or hydrocarbon in a gaseous state upstream of the inlet-side plugs to maintain at least part of the inlet-side plugs and their downstream regions at a temperature substantially equal to or higher than the lowest activation temperature of the catalyst.

25 Claims, 6 Drawing Sheets

CERAMIC HONEYCOMB FILTER AND EXHAUST GAS-CLEANING METHOD

FIELD OF THE INVENTION

The present invention relates to a ceramic honeycomb filter suitable for an exhaust gas-cleaning apparatus for an automobile engine, particularly for a cleaning apparatus for removing particulates from an exhaust gas from a diesel engine, and an exhaust gas-cleaning method using such a ceramic honeycomb filter.

BACKGROUND OF THE INVENTION

Figure 3:
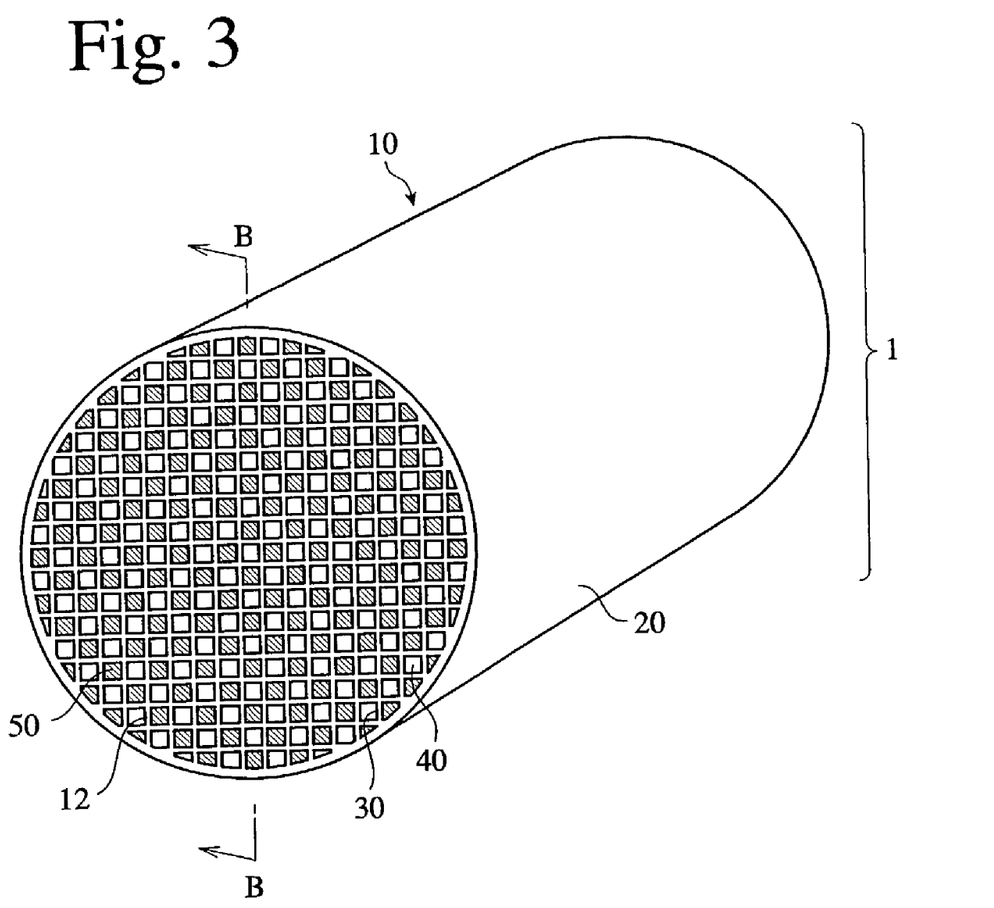
FIG. 3 is a perspective view showing a conventional honeycomb filter.
Figure 4:
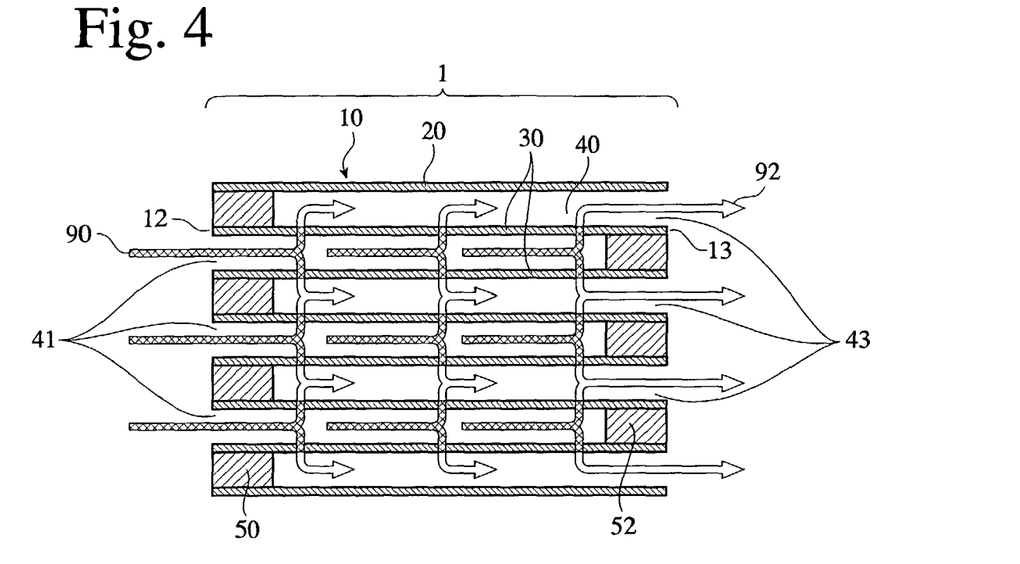
FIG. 4 is a partial cross-sectional view taken along the line B—B in FIG. 3.

Recently, ceramic honeycomb filters comprising ceramic honeycomb structures with a plurality of flow paths sealed alternately at both ends have been finding applications in removing particulates containing carbon as a main component from exhaust gases from diesel engines. As shown in FIGS. 3 and 4, a porous ceramic honeycomb filter 1, which is usually substantially cylindrical or elliptical, comprises (a) a porous ceramic honeycomb structure 10 comprising an outer wall 20, and porous partition walls 30 disposed inside the outer wall 20, with a large number of flow paths 40 encircled by the outer wall 20 and the porous partition walls 30 or by the adjacent porous partition walls 30, and (b) plugs 50, 52 for alternately sealing the inlet-side opening ends 12 and the outlet-side opening ends 13 of the flow paths 40.

An exhaust gas-cleaning mechanism in the honeycomb filter 1 is shown in FIG. 4. Because the plugs 52 are disposed at the outlet-side opening ends 13 of the flow paths 40, an exhaust gas (shown by the black arrow 90) flowing into flow paths 41 open at the inlet-side opening end 12 of the honeycomb filter 1 passes through the pores of the partition walls 30, and is discharged from flow paths 43 open at the adjacent outlet-side opening end 13 (shown by the white arrow 92). At this time, particulates contained in the exhaust gas are captured in the pores of the partition walls 30, resulting in the cleaning of the exhaust gas. When particulates captured in the pores exceed a predetermined amount, the clogging of the pores takes place, causing the pressure loss of the honeycomb filter 1 to increase and thus resulting in decrease in an engine output.

When the pores are clogged, the supply of an exhaust gas to the honeycomb filter 1 is stopped, and the captured particulates are burned by a burner or an electric heater to regenerate the honeycomb filter 1. In a case where particulates are burned and removed by a burner or an electric heater, the larger the amount of particulates captured, the more difficult it is to uniformly control the temperature in the honeycomb filter 1. Particularly in portions in which particulates are accumulated in a high concentration, the temperature of the honeycomb filter 1 is likely elevated, the honeycomb filter 1 is highly likely to be broken by thermal stress generated by the burning of particulates. In some cases, the temperature of the honeycomb filter 1 is elevated to the melting point of a ceramic material forming the partition walls 30 or higher, so that the partition walls 30 are broken or melted. On the other hand, if the highest temperature of the honeycomb filter 1 were suppressed to avoid breakage and melting, the regenerated honeycomb filter 1 would fail to have sufficiently low pressure loss because of the cinders of particulates.

JP 3-68210 B discloses an exhaust gas-cleaning structure for easily regenerating a honeycomb filter, comprising a honeycomb structure having a large number of cells, plugs for alternately sealing the inlet and outlet sides of each cell, a shell covering the honeycomb structure and having exhaust gas inlet and outlet, and a heating means disposed on the inlet side of the honeycomb structure in the shell, the plugs on the inlet side being disposed inside the inlet-side opening ends of the cells, and the plugs on the outlet side being disposed at the outlet-side opening ends of the cells. This exhaust gas-cleaning structure has a space between the inlet-side plugs and the outlet-side opening ends of the cells, and a large amount of particulates are attached to the partition walls of the cells facing the space. Accordingly, heat generated by the heating means disposed at the inlet-side cell opening ends is effectively conducted downstream, making it easy to burn particulates in a downstream region.

However, in the honeycomb filter of JP 3-68210 B, because the heating means is disposed only on the inlet side of the cells, it is difficult to uniformly control the temperature inside the honeycomb filter long in a flow path direction from the inlet side to the outlet side. Accordingly, as the amount of particulates increases, the temperature locally becomes too high due to heat generation by the burning of particulates, making it likely that the honeycomb structure is broken and melted. Also, the control of the heating means should be conducted precisely, resulting in a high energy cost, which in turn makes the overall exhaust gas-cleaning apparatus expensive.

JP 7-106290 B discloses a filter for particulates in a diesel exhaust gas, which comprises a catalyst comprising a platinum-group metal and an alkaline earth metal oxide, which is carried on the surfaces of partition walls, the burning start temperature of particulates being lowered by the action of the catalyst to continuously remove the particulates. This filter can be continuously regenerated even at such low temperatures as the exhaust gas temperatures of diesel engines, thereby preventing the clogging of the filter by particulates.

However, this filter cannot prevent pressure loss increase due to clogging by particulates in some cases. The reason therefor is that because driving continues at an exhaust gas temperature lower than about 300° C., which is the lower limit of the activation temperature of a catalyst carried on the filter, in a low-speed driving environment like a big city, the burning of particulates by the catalyst is less likely to be conducted well.

To solve such problems, JP 2002-122015 A discloses a method for cleaning an exhaust gas by capturing particulates in an exhaust gas by a catalyst-regenerable filter disposed in the middle of an exhaust pipe in which an exhaust gas from a diesel engine flows and burning and removing particulates accumulated in the filter, comprising injecting a fuel inside a filter region upstream of the plugs at the start of the diesel engine; igniting the fuel to elevate the temperature in the filter to a temperature substantially equal to or higher than the lowest activation temperature of the catalyst; and injecting a fuel into a filter region upstream of the plugs without ignition during the subsequent stationary operation, thereby causing heat generation by an oxidation reaction of the fuel on the catalyst, to maintain the temperature in the filter to a temperature substantially equal to or higher than the lowest activation temperature of the catalyst. The catalyst is always kept in a stably active state by the oxidation reaction of the fuel without regard to the operation conditions of the diesel engine, so that particulates captured in the filter are continuously burned. However, even this exhaust gas-cleaning method is likely to fail to prevent the filter from prematurely suffering from pressure loss increase by clogging by particulates.

OBJECTS OF THE INVENTION

Accordingly, an object of the present invention is to provide a ceramic honeycomb filter, which is continuously regenerated by burning particulates in an exhaust gas by the action of a catalyst carried on a porous ceramic honeycomb structure, thereby avoiding pressure loss increase that would occur due to the accumulation of particulates, and thus preventing the breakage and melting of the filter, to secure stable use for a long period of time.

Another object of the present invention is to provide a method for cleaning an exhaust gas by using such a ceramic honeycomb filter.

DISCLOSURE OF THE INVENTION

Figure 5:
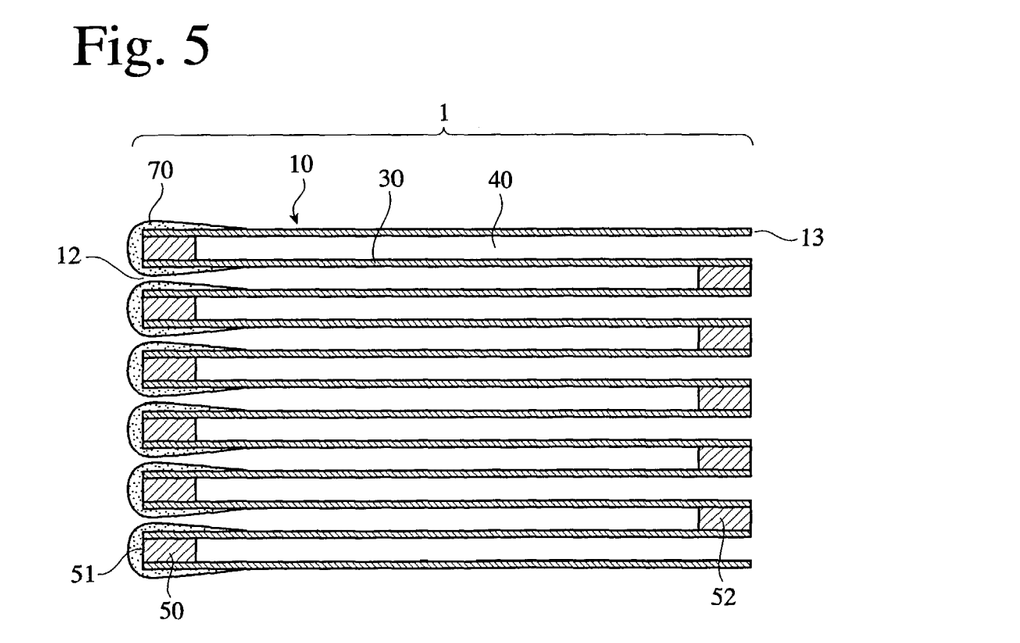
FIG. 5 is a cross-sectional view schematically showing a honeycomb filter in which particulates are accumulated.

As a result of detailed investigation of the cause of pressure loss increase of the honeycomb filter used in the exhaust gas-cleaning method of JP 2002-122015 A, the inventors have found that because particulates are accumulated mostly on the front end surfaces 51 of the inlet-side plugs 50 as shown in FIG. 5, the flow paths 40 are clogged at the opening ends thereof, resulting in pressure loss increase in the honeycomb filter 1. Further, as a result of detailed investigation on the accumulation of particulates 70 on the exhaust gas inlet side 12 of the honeycomb filter 1, the inventors have found that the cause of pressure loss in the honeycomb filter 1 is that there appears a temperature distribution in the honeycomb filter 1 in a flow path direction when unburned fuel and/or hydrocarbon in a gaseous state is injected into a filter region upstream of the plugs 50, while the amount of particulates 70 accumulated on the filter 1 carrying a catalyst exceeds a predetermined amount depending on the operation conditions of a diesel engine.

Figure 6:
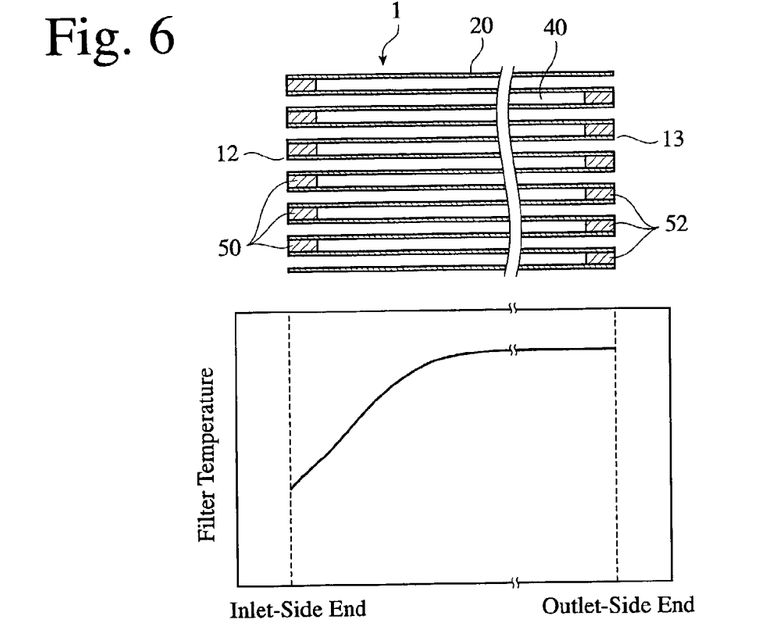
FIG. 6 is a graph showing the temperature variation of a conventional ceramic honeycomb filter in a longitudinal direction.

As shown in FIG. 6, the temperature distribution in the honeycomb filter 1 in a flow path direction is such that the temperature is lowest in the inlet-side opening ends 12 of the cells, increases as going inside the filter 1, and becomes substantially constant (equal to the temperature of the outlet-side opening end 13) downstream of a certain position. Accordingly, a catalyst carried on the honeycomb filter 1 on the exhaust gas inlet side is not heated to a catalyst activation temperature, exhibiting low activity. As a result, the burning of particulates does not sufficiently occur on the exhaust gas inlet side, so that particulates are accumulated on the front end surfaces 51 of the inlet-side plugs 50, thereby clogging the opening ends of the flow paths 40 in the vicinity of the front end surface 51 of the plug 50, and thus increasing the pressure loss of the honeycomb filter 1.

The reason why there appears a temperature distribution in a flow path direction in a conventional ceramic honeycomb filter as shown in FIG. 6, when unburned fuel and/or hydrocarbon in a gaseous state is injected to elevate the filter temperature is that the oxidation reaction of unburned fuel and/or hydrocarbon in a gaseous state is not sufficiently accelerated by the catalyst on the inlet side of the filter. When the exhaust gas goes in the flow paths of the filter, the unburned fuel and/or hydrocarbon in a gaseous state in the exhaust gas is burned by the action of the catalyst carried on the filter surface. As a result, not only the temperature of the honeycomb filter in the upstream region is elevated, but also is the temperature in the downstream region elevated by the heated exhaust gas. Because the temperature elevation of the honeycomb filter is less likely to occur as the unburned fuel and/or hydrocarbon, which is oxidized in the presence of a catalyst, decreases in the exhaust gas, the filter temperature becomes substantially constant downstream of a position separate from the inlet-side opening ends of the cells of the honeycomb filter by the predetermined distance.

As a result of intense research, the inventors have found that particulates accumulated on the front end surfaces of the inlet-side plugs can easily be burned and removed by (a) injecting unburned fuel and/or hydrocarbon in a gaseous state into a region upstream of inlet-side plugs, when the amount of particulates accumulated on the filter carrying a catalyst exceeds the predetermined level, presuming the amount of particulates accumulated depending on the operation conditions of a diesel engine, causing the oxidation reaction of the unburned fuel and/or hydrocarbon on the catalyst, and maintaining the temperature in the filter by its reaction heat at a temperature substantially equal to or higher than the lowest activation temperature of the catalyst; and (b) disposing the front end surfaces of the inlet-side plugs, on which particulates are likely to be accumulated most in the filter, at a position at which the temperature can be elevated close to the lowest catalyst activation temperature. The present invention has been completed based on these findings.

Thus, the ceramic honeycomb filter of the present invention comprises a ceramic honeycomb structure having porous partition walls defining a plurality of flow paths, and plugs disposed inside the flow paths such that an exhaust gas passes through pores of the porous partition walls, thereby removing particulates from the exhaust gas; a catalyst being carried at least partially on the partition walls and/or the plugs; and at least one of plugs on the side of exhaust gas inlets being disposed at a position separate from the inlet-side opening ends of the flow paths.

The exhaust gas preferably passes through at least pores of porous partition walls existing between the inlet-side opening ends of the flow paths and plugs separate therefrom.

The front end surfaces of the inlet-side plugs are preferably positioned such that a catalyst carried at least partially on the inlet-side plugs is kept at its lowest activation temperature or higher during the operation of an internal combustion engine. Further, the front end surfaces of the inlet-side plugs are preferably positioned in a region of 0.7 times the entire length of the ceramic honeycomb filter or less from the inlet-side opening end of the ceramic honeycomb filter.

The catalyst carried on the ceramic honeycomb filter preferably comprises at least a platinum-group metal. The catalyst carried on partition wall portions on the side of the exhaust gas inlet is preferably higher in activity than the catalyst carried on partition wall portions on the side of the exhaust gas outlet.

The method for removing particulates from an exhaust gas according to the present invention uses a ceramic honeycomb filter comprising a ceramic honeycomb structure having porous partition walls defining a plurality of flow paths, and plugs disposed inside the flow paths such that an exhaust gas passes through pores of the porous partition walls, a catalyst being carried at least partially on the partition walls and/or the plugs, and at least one of plugs on the side of an exhaust gas inlet being disposed at a downstream position separate from the inlet-side opening ends of the flow paths. The method comprises injecting unburned fuel and/or hydrocarbon in a gaseous state upstream of the inlet-side plugs to maintain at least part of the inlet-side plugs and their downstream regions at a temperature substantially equal to or higher than the lowest activation temperature of the catalyst.

DESCRIPTION OF THE PREFERRED EMBODIMENTS

[1] Ceramic Honeycomb Filter

Figure 1:
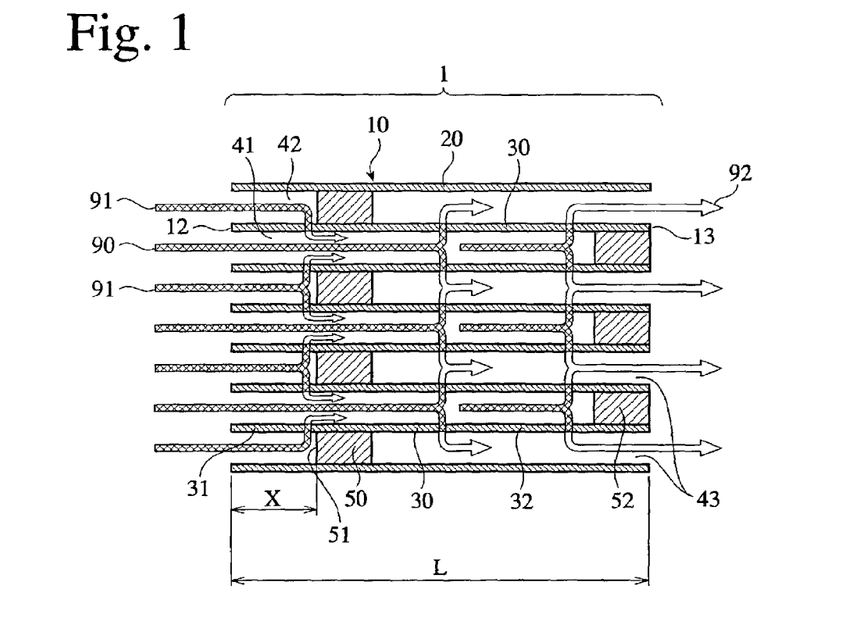
FIG. 1 is a schematic cross-sectional view showing a ceramic honeycomb filter according to one embodiment of the present invention.

FIG. 1 shows one example of the ceramic honeycomb filter of the present invention. The honeycomb filter 1 shown in FIG. 1 comprises (a) a porous ceramic honeycomb structure 10 having a substantially circular or elliptic shape in a cross section perpendicular to flow paths, which comprises an outer wall 20, and porous partition walls 30 defining a plurality of flow paths 40 inside the outer wall 20, and (b) plugs 50, 52 disposed in the desired portions of each flow path 40 to seal the flow paths 40 alternately. A front end surface 51 of at least one of the plugs 50 on the exhaust gas inlet side is separate from the inlet-side opening end 12 of the ceramic honeycomb filter 1 in a downstream direction. A catalyst (not shown) is carried at least partially on the partition walls 30 and/or plugs 50, 52.

In the honeycomb filter having such structure, an exhaust gas flows into the flow paths 41, 42 from the inlet-side opening end 12. A exhaust gas 91 flowing into the flow paths 42 passes through the pores of the upstream-side partition wall portions 31 by the existence of the inlet-side plugs 50, flows into the adjacent flow paths 41, combines with an exhaust gas 90 flowing into the flow paths 41, progresses toward the outlet-side opening end 13, passes through the pores of the downstream-side partition wall portions 32, flows into the adjacent flow paths 43 (open at the outlet-side opening end 13), and exits from the filter 1 as shown by the arrow 92. While the exhaust gas passes through the flow paths 41–43 and the partition wall portions 31, 32, particulates in the exhaust gas are burned by the action of the catalyst, thereby discharging the cleaned exhaust gas.

Figure 7:
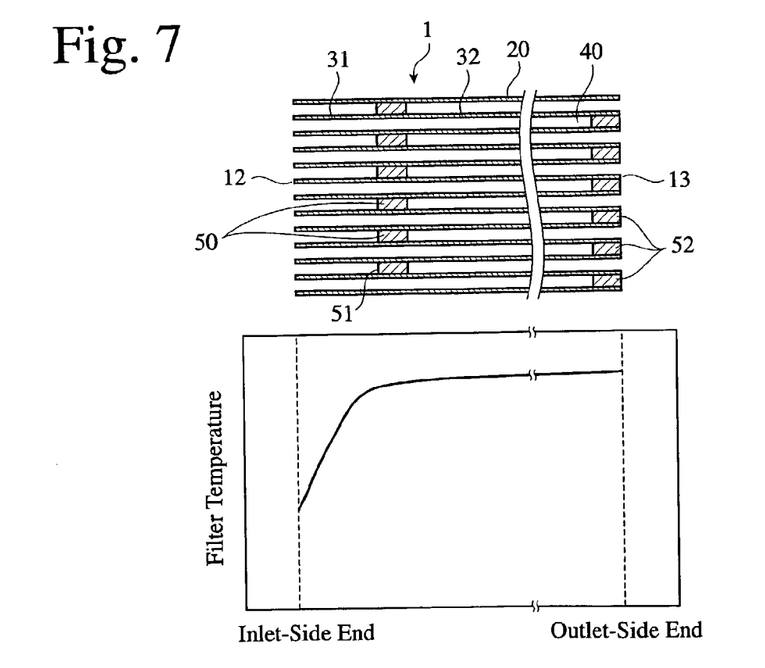
FIG. 7 is a graph showing the temperature variation of the ceramic honeycomb filter of the present invention in a longitudinal direction.

As shown in FIGS. 1 and 7–11, at least one of the plugs 50 on the exhaust gas inlet side cells is separate from the inlet-side opening end 12. When the amount of particulates accumulated on the honeycomb filter 1 exceeds the provided level during the operation of an internal combustion engine, unburned fuel and/or hydrocarbon in a gaseous state is injected into an upstream part of the filter 1 to make the temperature of the honeycomb filter 1 higher, so that unburned fuel and/or hydrocarbon in a gaseous state is oxidized by the action of the catalyst in the filter 1, generating a reaction heat. As a result, there arises a temperature distribution in the filter 1 as shown in FIG. 7. Because temperature elevation takes place in the front end surfaces 51 of the inlet-side plugs 50, on which particulates are likely to be accumulated, the activity of a catalyst carried on the front end surfaces 51 of the plugs 50 is increased, making the burning of particulates easy. It is thus possible to prevent particulates from being accumulated on the front end surfaces 51 of the inlet-side plugs 50.

As shown in FIG. 7, because there is temperature increase in the partition wall portions 32 downstream of the inlet-side plugs 50, the catalyst carried on the partition wall portions 32 also has increased activity, making the burning of particulates easy. Accordingly, when the exhaust gas flowing into the flow paths 40 passes through the pores of the partition wall portions 32 and flows into the adjacent flow paths 43, particulates in the exhaust gas are burned, resulting in the cleaning of the exhaust gas.

As described above, when the amount of particulates accumulated in the honeycomb filter 1 exceeds the provided level during the operation of an internal combustion engine, unburned fuel and/or hydrocarbon in a gaseous state is injected into the upstream region of the filter 1 for the purpose of elevating the temperature of the honeycomb filter 1, so that particulates are burned by the action of the catalyst in the inlet-side plugs 50, the upstream partition wall portions 31 and the downstream partition wall portions 32, resulting in the cleaning of the exhaust gas. Accordingly, unlike the conventional honeycomb filter, the ceramic honeycomb filter 1 of the present invention is less likely subjected to a phenomenon that particulates are accumulated at the opening ends of the flow paths 40 as shown in FIG. 5, resulting in pressure loss increase by the clogging of flow paths. By the method of the present invention, particulates are effectively burned by the action of the catalyst, so that the problems of the breakage and melting of the filter can be avoided, and that the exhaust gas can be cleaned without increasing pressure loss for a long period of time.

Further, when it is presumed that the amount of particulates accumulated on the honeycomb filter 1 has exceeded a certain level during the operation of an internal engine, unburned fuel and/or hydrocarbon in a gaseous state is injected upstream of the filter 1 for the purpose of elevating the temperature of the honeycomb filter 1, resulting in a temperature distribution as shown in FIG. 7 in the ceramic honeycomb filter 1. With such temperature distribution, thermal conduction occurs from the inlet-side plugs 50 and their downstream partition walls 32 to the partition walls 31 upstream of the inlet-side plugs 50, resulting in the temperature elevation of the partition walls 31 with time. As a result, the temperature of the inlet-side opening end 12 of the ceramic honeycomb filter 1 is also elevated, increasing the activity of a catalyst carried on the partition walls 31 upstream of the inlet-side plugs 50, and thus burning particulates surely. The accumulation of particulates on the front end surfaces 51 of the inlet-side plugs 50 is thus prevented.

By adjusting the amount of unburned fuel and/or hydrocarbon injected in a gaseous state, the temperature in the inlet-side plugs 50 and their downstream region in the honeycomb filter 1 may be elevated to 600° C. or higher, at which the self-burning of particulates occurs. In this case, particulates are easily burned on the front end surfaces 51 of the inlet-side plugs 50, on which particulates are likely to be accumulated, without using a catalyst, whereby the accumulation of particulates can be prevented on the front end surfaces 51 of the inlet-side plugs 50.

When the amount of particulates accumulated in the honeycomb filter 1 is at the predetermined level or less during the operation of an internal combustion engine, and when the temperature of an exhaust gas from the internal combustion engine is as high as substantially equal to or higher than the lowest activation temperature (there is no need of injecting unburned fuel and/or hydrocarbon in a gaseous state on the upstream side of the plugs 50), particulates in the exhaust gas are burned by the activated catalyst, so that the exhaust gas 90, 91 flowing into the honeycomb filter 1 is cleaned while passing through the flow paths 40 and partition walls 30 of the honeycomb filter 1.

Figure 10:
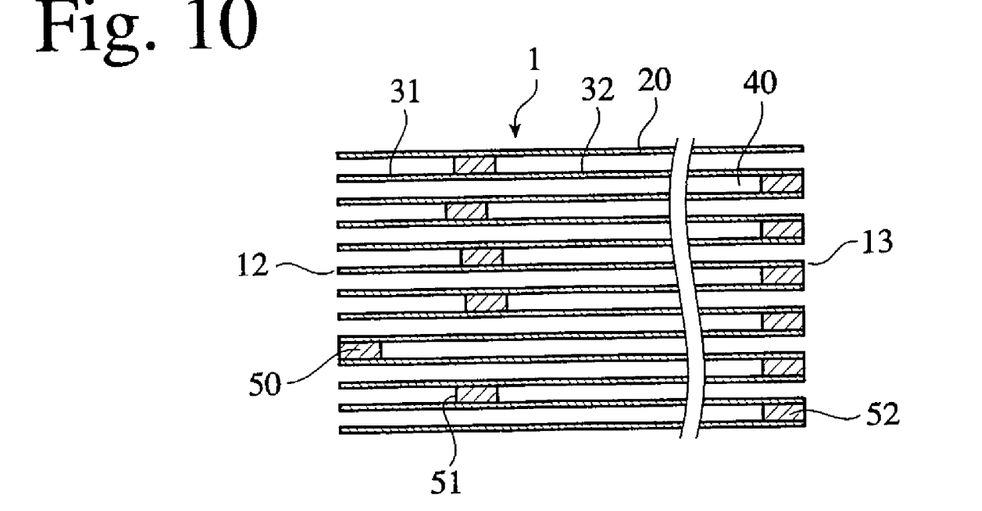
FIG. 10 is a schematic cross-sectional view showing a ceramic honeycomb filter according to a still further embodiment of the present invention.

As shown in FIG. 1, all of the inlet-side plugs 50 need not be separate from the inlet-side opening end 12, and what is necessary is only that part of the inlet-side plugs 50 are separate from the inlet-side opening end 12 to such an extent that the object of the present invention can be achieved, as shown in FIG. 10. If 70% or more of the inlet-side plugs 50 are separate from the inlet-side opening ends 12 of the cells, it is possible to prevent pressure loss increase effectively by the accumulation of particulates. When the inlet-side plugs 50 separate from the inlet-side opening ends 12 are less than 70%, the percentage of the plugs 50 in a high-temperature region of the ceramic honeycomb filter 1 is too low, so that a large amount of particulates are accumulated on the front end surfaces 51 of the plugs 50 in a low-temperature region, failing to effectively prevent the pressure loss increase of the honeycomb filter 1.

Figure 8:
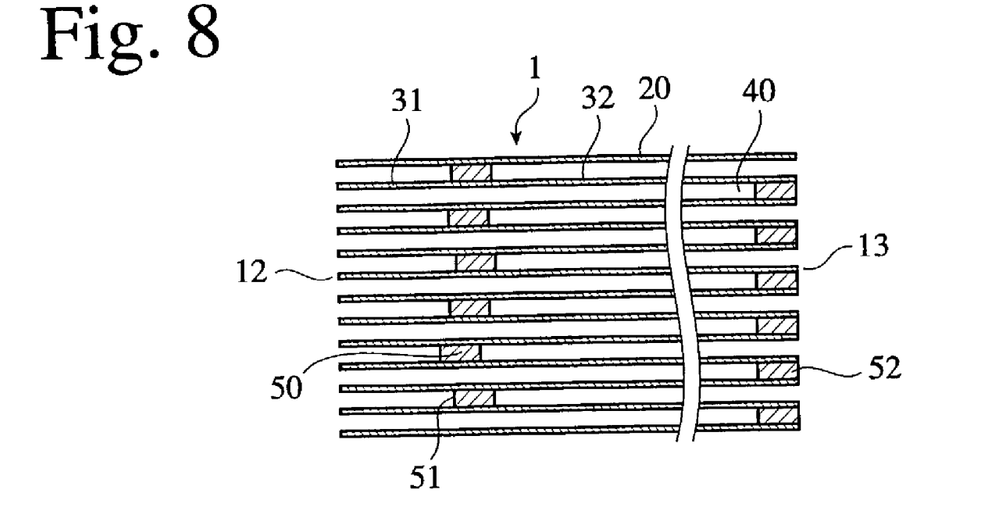
FIG. 8 is a schematic cross-sectional view showing a ceramic honeycomb filter according to another embodiment of the present invention.
Figure 9:
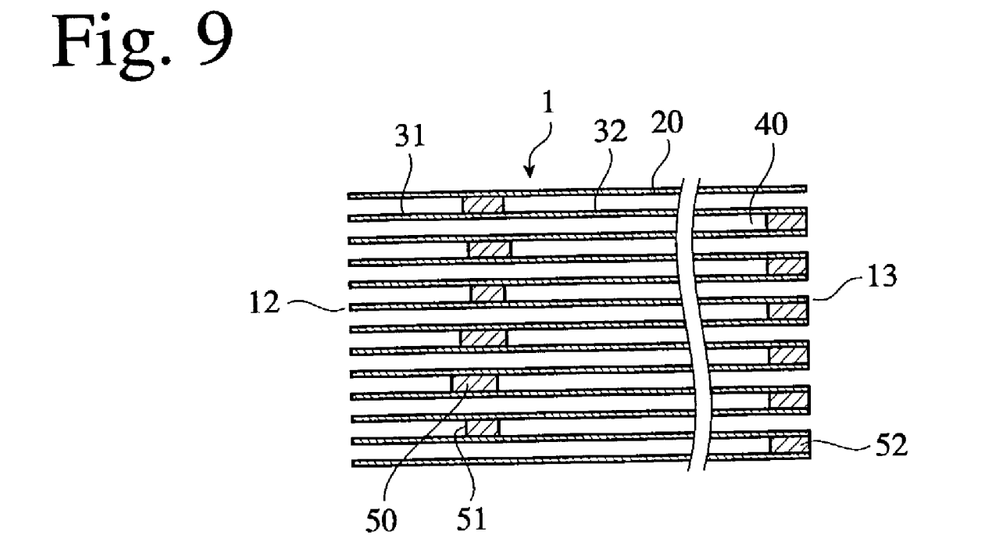
FIG. 9 is a schematic cross-sectional view showing a ceramic honeycomb filter according to a further embodiment of the present invention.

As described above, because the plugs 50 need only be in a high-temperature region of the ceramic honeycomb filter 1, the front end surfaces 51 of the plugs 50 need not be separate from the inlet-side opening end 12 by the same distance as shown in FIG. 8, nor need the inlet-side plugs 50 and the outlet side plugs 52 have the same length as shown in FIG. 9. Also, as long as the effects of the present invention can be obtained, the exhaust gas outlet-side plugs 52 may not be separate from the end of the filter 1 by the same distance.

Figure 11:
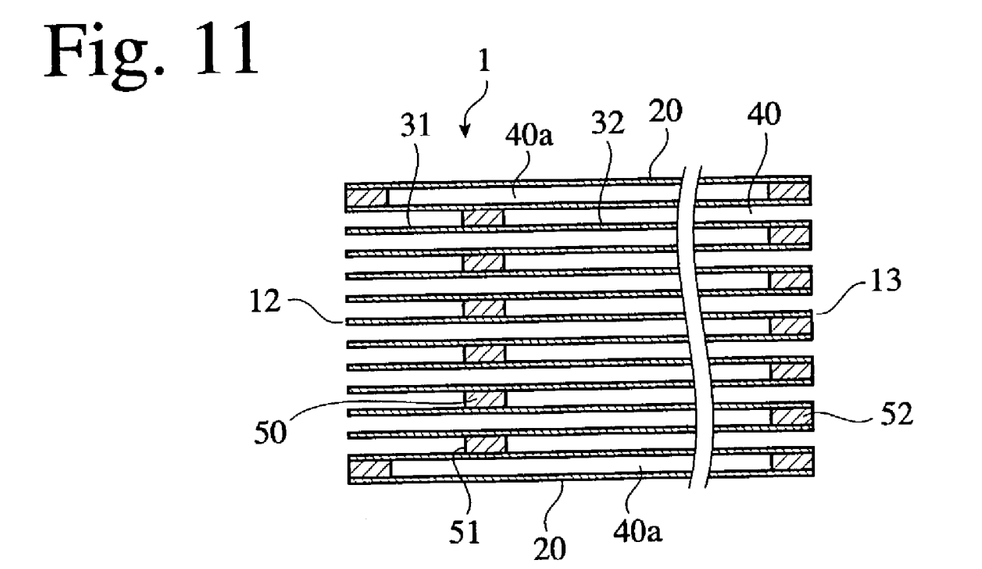
FIG. 11 is a schematic cross-sectional view showing a ceramic honeycomb filter according to a still further embodiment of the present invention.

As shown in FIG. 11, in the case of a ceramic honeycomb filter 1 having a structure in which both ends of flow paths 40a near the outer wall 20 are sealed, these flow paths 40a act as an insulation space because the exhaust gas does not flow thereinto. Accordingly, it is possible to prevent heat in the ceramic honeycomb filter 1 from escaping outside via the outer wall 20, a grip member and a metal container, so that the temperature inside the ceramic honeycomb filter 1 can be kept uniform.

Like the exhaust gas inlet-side plugs 50, the same effects can be obtained, when the exhaust gas outlet-side plugs 52 are separate from the outlet-side opening end 13 of the ceramic honeycomb filter 1, or even when the exhaust gas outlet-side plugs 52 are projecting from the outlet-side opening end 13.

The exhaust gas preferably passes through the pores of the partition wall portions 31 upstream of the plugs 50 separate from the inlet-side opening end 12 in the ceramic honeycomb filter 1 of the present invention. The reason therefor is that though the partition wall portions 31 upstream of the inlet-side plugs 50 are positioned in a lower-temperature region than the inlet-side plugs 50 as shown in FIG. 7, a catalyst carried on the partition wall portions 31 is at a higher temperature than the inlet-side opening end 12, resulting in the catalyst with higher activity. Accordingly, while an exhaust gas in the flow paths 42 are flowing into the adjacent flow paths 41 via the pores of the partition wall portions 31, particulates in the exhaust gas are burned, resulting in the cleaning of the exhaust gas.

The front end surfaces 51 of the inlet-side plugs 50 are preferably at such positions in the honeycomb filter 1 of the present invention that a catalyst carried on the upstream partition wall portions 31 is kept at a temperature substantially equal to or higher than the lowest activation temperature, when unburned fuel and/or hydrocarbon in a gaseous state is injected in upstream regions of the plugs 50 for at least a certain period (period in which the amount of particulates accumulated on the honeycomb filter 1 is at the provided level or more) during the operation of an internal combustion engine. This is for the purpose of surely burning and thus removing particulates by the action of the catalyst, thereby preventing a phenomenon that the plugs 50 are clogged due to the accumulation of particulates on the front end surfaces 51 of the inlet-side plugs 50. Incidentally, it should be understood that "substantially equal to or higher than the lowest activation temperature of the catalyst" is not restricted to a case where the front end surfaces 51 of the plugs 50 are at temperatures equal to or higher than the lowest activation temperature, but includes a case where their temperature is lower than the lowest catalyst activation temperature but sufficiently close thereto.

The front end surfaces 51 of the plugs 50 are preferably positioned in a region X of 0.7 times the entire length L of the ceramic honeycomb filter 1 or less from the inlet-side opening end 12. When the front end surfaces 51 of the plugs 50 are positioned outside the region X, the area of the partition wall portions 32 downstream of the plugs 50 is smaller than the area of the upstream partition wall portions 31. As a result, the overall honeycomb filter 1 is likely to suffer from increase in initial pressure loss. In a case where unburned fuel and/or hydrocarbon in a gaseous state are injected into regions upstream of the plugs 50 to obtain sufficient effect of elevating the filter temperature by the catalyst, the plugs 50 are preferably separate from the inlet-side opening end 12 by 1 mm or more. The region X in which the front end surfaces 51 of the plugs 50 are positioned preferably in a range from 0.1 times to 0.4 times the entire length L of the ceramic honeycomb filter 1 from the inlet-side opening end 12 of the ceramic honeycomb filter 1.

The catalyst carried on the ceramic honeycomb filter 1 of the present invention preferably contains platinum-group metals. Unburned fuel and/or hydrocarbon in a gaseous state injected upstream of the plugs 50 is burned in the presence of a catalyst containing platinum-group metals, to generate a reaction heat, which elevates the temperature inside the filter 1. As a result, the catalyst is activated, accelerating the oxidation reaction of particulates contained in the exhaust gas.

The oxidation reaction of particulates by the action of a catalyst containing platinum-group metals occurs as follows: When carbon (C), a main component of particulates in the exhaust gas, is brought into contact with the catalyst containing activated platinum-group metals, it is oxidized by a reaction with oxygen ($O_2$) to form carbon dioxide ($CO_2$). As a result, the ceramic honeycomb filter 1 can be used for a long period of time without suffering from pressure loss increase due to the accumulation of particulates.

The platinum-group metals in the catalyst are not restricted to one or more platinum-group metals such as Pt, Pd, Ru, Rh, etc., but may be their oxides, etc. Also, the catalyst may contain alkaline earth metal oxides, rare earth oxides, or base metal catalysts [typically lanthanum, cesium, vanadium (La/Cs/$V_2O_3$)], etc. When a material having a high specific surface area, which is made of activated alumina such as γ-alumina, is used as a catalyst carrier, there is a large contact area of the catalyst with an exhaust gas, resulting in increase in the cleaning efficiency of the exhaust gas.

In the ceramic honeycomb filter of the present invention, the catalyst carried on the partition wall portions 31 on the upstream side of the plugs 50 has higher activity than the catalyst carried on the partition wall portions 32 downstream of the plugs 50. This can be achieved, for instance, by making the content of platinum-group metals and the content of cocatalysts such as alkaline earth metal oxides, rare earth oxides or base metal catalysts in the catalyst carried on the partition wall portions 31 larger than those in the catalyst carried on the partition wall portions 32.

Because the unburned fuel and/or hydrocarbon in a gaseous state injected upstream of the plugs 50 is burned more on the partition wall portions 31 than on the partition wall portions 32, the temperature of the partition wall portions 31 is higher than that of the partition wall portions 32, resulting in efficient increase in the activity of the catalyst carried on the front end surfaces 51 of the plugs 50. As a result, particulates are efficiently prevented from being accumulated on the front end surfaces 51 of the plugs 50, and carbon (C), a main component of particulates, is highly converted to $CO_2$ by the catalyst carried on the partition wall portions 31. Therefore, particulates in the exhaust gas are efficiently burned, so that the ceramic honeycomb filter 1 can be used for a long period of time without increasing pressure loss.

In a preferred embodiment, to use the ceramic honeycomb filter for a long period of time without increasing pressure loss, the content of a platinum-group metal is higher in the catalyst carried on the partition wall portions 31 than in the catalyst carried on the partition wall portions 32. In another preferred embodiment, the catalyst on the partition wall portions 31 has a larger content of a platinum-group metal as an oxidation catalyst, while the catalyst on the partition wall portions 32 contains larger amounts of a cocatalyst and a platinum-group metal, resulting in increased efficiency in the burning of particulates.

The exhaust gas-cleaning method of the present invention comprises injecting unburned fuel and/or hydrocarbon in a gaseous state into a region on the upstream side of the plugs 50 in the ceramic honeycomb filter 1 having the above structure, to oxidize the fuel and/or hydrocarbon in the presence of the catalyst to generate a reaction heat, which is used to maintain at least a region downstream of the plugs 50 in the ceramic honeycomb filter 1 at a temperature substantially equal to or higher than the lowest activation temperature of the catalyst. Accordingly, even if the exhaust gas from an internal combustion engine has a low temperature, the burning of the fuel and/or hydrocarbon injected upstream of the plugs 50 heats the exhaust gas in the honeycomb filter 1, maintaining the catalyst carried on the honeycomb filter 1 at the lowest activation temperature or higher, and thereby well removing particulates from the exhaust gas. As a result, in the exhaust gas-cleaning method using the ceramic honeycomb filter 1 of the present invention, the pressure loss of the ceramic honeycomb filter 1 does not increase for a long period of time. Thus, the plugs 50, on which particulates are likely to be accumulated, are separate from the inlet-side opening ends 12 of the cells in the ceramic honeycomb filter 1 of the present invention. Accordingly, particulates in the exhaust gas are burned more efficiently in the ceramic honeycomb filter 1 of the present invention than in a conventional honeycomb filter 1, in which inlet-side plugs 50 are formed at the inlet-side opening ends 12 of the cells.

Because the ceramic honeycomb filter 1 of the present invention removes particulates from an exhaust gas mainly from diesel engines, materials constituting the porous ceramic honeycomb structure and plugs are preferably those having excellent heat resistance, particularly ceramic materials containing as main components at least one selected from the group consisting of cordierite, alumina, mullite, silicon nitride, silicon carbide and LAS. Among them, the ceramic honeycomb filter 1 containing cordierite as a main component is particularly preferable, because it is inexpensive and excellent in heat resistance and corrosion resistance, with a low thermal expansion coefficient.

The partition walls of the honeycomb structure preferably have a porosity of 50–80%. Because the exhaust gas passes through the pores of the partition walls, the porosity of the partition walls less than 50% results in too high pressure loss in the honeycomb filter, leading to decrease in engine output. On the other hand, when the porosity of the partition walls exceeds 80%, the strength of the partition walls is too low, and thus the honeycomb structure is likely to be broken by thermal shock and mechanical vibration during use.

Though the porosity of the plugs may be lower or higher than, or substantially equal to the porosity of the partition walls, it is preferably higher than the porosity of the partition walls. When the porosity of the plugs is higher than the porosity of the partition walls, the exhaust gas passes through the pores of the plugs, too, making it unlikely for particulates to be accumulated on the front end surfaces 51 of the inlet-side plugs 50.

The partition walls of the honeycomb structure preferably have a thickness of 0.1–0.5 mm and a pitch of 1.3 mm or more. When the thickness of the partition walls is less than 0.1 mm, the porous ceramic honeycomb structure with high-porosity partition walls have too low strength. On the other hand, when the thickness of the partition walls exceeds 0.5 mm, there is too large resistance for the exhaust gas to pass through the partition walls, resulting in too large pressure loss in the ceramic honeycomb filter. The more preferred thickness of the partition walls is 0.2–0.4 mm. When the pitch of the partition walls is less than 1.3 mm, the honeycomb structure has too small opening area, resulting in large pressure loss in the filter.

[2] Production of Ceramic Honeycomb Filter

Figure 2A:
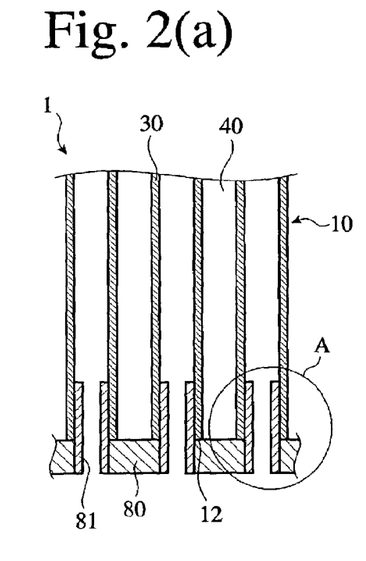
FIG. 2(a) is a schematic cross-sectional view showing a state where a plug slurry is introduced into the ceramic honeycomb structure.
Figure 2B:
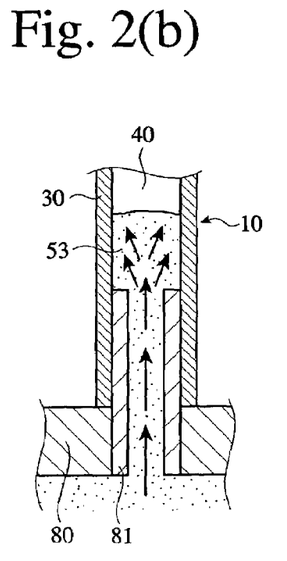
FIG. 2(b) is an enlarged cross-sectional view showing a portion A in FIG. 2(a)
Figure 2C:
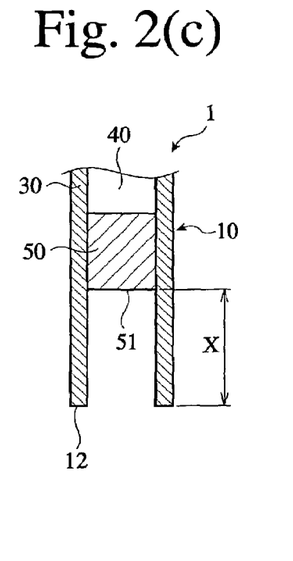
FIG. 2(c) is an enlarged cross-sectional view showing the end portion of the honeycomb structure after the resin mask and the slurry are removed from the partition wall ends.

Referring to FIG. 2, one example of methods for producing the ceramic honeycomb filter 1 of the present invention will be explained. As shown in FIG. 2(a), a resin mask 80 provided with slurry-introducing pipes 81 in a checkerboard pattern is attached to the inlet-side opening ends 12 of the cells of the honeycomb structure 10. As shown in FIG. 2(b), a plug-forming slurry 53 is introduced into the pipes 81, so that part of the flow paths 40 of the honeycomb structure 10 are charged with the slurry 53. Water in the slurry 53 is absorbed in the partition walls 30 of the honeycomb structure 10, and the resultant plugs 50 are fixed to the partition walls 30 with sufficient shape retention. Thereafter, an unsolidified slurry 53 is discharged, and the resin mask 80 is removed to dry the solidified plugs 50. Because the slurry 53 remaining in the resin pipes 81 are deprived of water by the partition walls 30, the plugs 50 are not formed in the flow paths 40 into which the resin pipes 81 are introduced. Thus, as shown in FIG. 2(c), a plug 50 having a front end surface 51 at a position separate from the inlet-side opening end 12 by the distance X is formed in each flow path 40. With the length of the slurry-introducing pipes 81 adjusted, the distance X of the plug 50 from the inlet-side opening end 12 can be determined. The plugs 52 at the outlet-side opening end 13 in the honeycomb structure 10 can be formed by known methods. After formation, the plugs 50, 52 on both sides are calcined, so that they are integrated with the partition walls 30.

Other methods than the above-described one for forming plugs include, for instance, (a) a method for forming plugs by inserting long, thin pipes into the honeycomb structure through one end thereof to a predetermined position, charging a predetermined amount of a plug paste into the honeycomb structure via these pipes, drying and calcining them; (b) a method for forming plugs by embedding ceramic chips in the honeycomb structure, and calcining them, etc.

The present invention will be described in detail referring to Examples below without intention of limiting the present invention thereto.

EXAMPLE 1

A starting material powder for cordierite comprising kaolin powder, talc powder, silica powder, aluminum hydroxide powder and alumina powder as main components was prepared. The starting material powder had a composition (by mass) comprising 47–53% of $SiO_2$, 32–38% of $Al_2O_3$, and 12–16% of MgO as main components, and additionally inevitable impurities of CaO, $Na_2O$, $K_2O$, $TiO_2$, $Fe_2O_3$, PbO and $P_2O_5$ in an amount of 2.5% or less in total. A molding aid and a pore-forming agent were added to this starting material powder, and water was added to carry out sufficient mixing to prepare an extrudable paste.

The paste was extrusion-molded to a green body having a honeycomb structure comprising an outer wall 20, and partition walls 30 defining a plurality of flow paths 40 each having a square cross section. After drying, the green body was calcined to form a porous honeycomb structure 10 having a diameter of 267 mm and an entire length L of 300 mm, the partition walls 30 having a pitch of 1.5 mm, a thickness of 0.3 mm, and a porosity of 65%.

As shown in FIG. 2(a), a resin mask 80 having slurry-introducing pipes 81 in a checkerboard pattern was attached to the honeycomb structure 10, such that each pipe 81 is inserted into an inlet-side opening end portion of each cell. A plug slurry 53 was charged into part of the flow paths 40 of the honeycomb structure 10 via the pipes 81. After plugs 50 were attached to the partition walls 30 with sufficient shape retention, the resin mask 80 was removed, and the plugs 50 were dried. The length of each slurry-introducing pipe 81 was adjusted, such that the inlet-side plugs 50 were formed with five different distances from the inlet-side opening end 12. On the other hand, plugs 52 on the side of the exhaust gas outlet-side opening end 13 of the honeycomb structure 10 were formed by attaching a masking film to the outlet-side opening end 13 with an adhesive, making openings in the masking film in a checkerboard pattern that is alternate to the checkerboard pattern for the plugs 50, and introducing a slurry into the outlet-side opening end portions. With a batch-type furnace with controlled temperature, the plugs 50, 52 were calcined to provide honeycomb filters 1 each having the structure shown in FIG. 1 as Samples 1–6.

In each honeycomb filter 1, metal rods each having a diameter of about 0.8 mm and a length of 200 mm were inserted into the inlet-side opening ends 12 of the cells, and the length of each metal rod projecting from the other end of the honeycomb filter 1 was measured to determine the distance X (mm) between the front end surfaces 51 of the inlet-side plugs 50 and the inlet-side opening end 12 of the honeycomb filter 1. This operation was carried out on arbitrarily selected 20 plugs 50 with respect to each honeycomb filter 1, and an average of the measured values was regarded as the distance X. The distance X and a ratio of X to the entire length L of the honeycomb filter in each Sample 1–6 are shown in Table 1.

A catalyst comprising platinum, cerium oxide and activated alumina was carried on the surfaces and pores of the partition walls 30 and the plugs of each honeycomb filter 1. The amount of Pt in the catalyst was 2 g per 1 L of the honeycomb filter 1.

With the resultant ceramic honeycomb filter 1 of each Sample 1–6 disposed in a pressure loss-measuring apparatus (not shown), air was introduced at a flow rate of 7.5 $Nm^3$/min, to measure pressure difference between the inlet-side opening end 12 and the outlet-side opening end 13, thereby evaluating the initial pressure loss of each ceramic honeycomb filter 1. Assuming that the initial pressure loss was 1 in the ceramic honeycomb filter 1 of Sample 1 in which the front end surfaces 51 of the inlet-side plugs 50 were on the same plane as front end surface of the honeycomb filter 1, the relative values of the initial pressure losses of Samples 2–6 are shown in Table 1.

The honeycomb filter 1 of each Sample 1–6 was disposed in an exhaust pipe of a diesel engine, to conduct a durability test under the conditions of pattern driving similar to town driving. In this test, there was a case where such driving conditions that the exhaust gas temperature was lower than the lowest catalyst activation temperature continued, thereby providing the condition that particulates were slightly accumulated in the filter. Presuming the amount of particulates accumulated on the filter depending on the driving conditions, a fuel in an unburned state was injected into a region of the filter 1 upstream of the plugs 50 to regenerate the filter 1, when the amount of particulates accumulated exceeded the provided level.

The evaluation of each Sample was "pass" when the test could be continued for a time period corresponding to 10,000-km driving, and "fail" when the test could not be continued. With respect to Samples evaluated as "pass," the pressure loss of the honeycomb filter 1 was measured like the initial pressure loss to calculate a pressure loss ratio [(pressure loss after the elapse of a time period corresponding to 10,000-km driving)/(initial pressure loss)], after the elapse of a time period corresponding to 10,000-km driving.

TABLE 1

| Sample No. | X (mm)[1] | X/L[2] | Initial Pressure Loss[3] | Pressure Loss Ratio | Evaluation |
|---|---|---|---|---|---|
| 1* | 0 | 0 | 1.0 | — | Fail |
| 2 | 49.8 | 0.17 | 0.9 | 1.2 | Pass |
| 3 | 96.3 | 0.32 | 0.8 | 1.1 | Pass |
| 4 | 138.2 | 0.46 | 0.7 | 1.1 | Pass |

TABLE 1-continued

| Sample No. | X (mm)[1] | X/L[2] | Initial Pressure Loss[3] | Pressure Loss Ratio | Evaluation |
|---|---|---|---|---|---|
| 5 | 157.5 | 0.53 | 0.8 | 1.2 | Pass |
| 6 | 240.0 | 0.80 | 1.2 | 1.4 | Pass |

Note:
*Outside the scope of the present invention.
[1]X represents the distance between the front end surface 51 of the plug 50 and the honeycomb filter opening end 12.
[2]L represents the entire length of the honeycomb filter.
[3]The relative value of the initial pressure loss when the initial pressure loss of Sample 1 was assumed as 1.

In Sample 1 in which the front end surfaces 51 of the inlet-side plugs 50 were on the same plane as the front end surface of the honeycomb filter 1, pressure loss increased drastically after about 5,000 km of driving, making it impossible to regenerate the honeycomb filter 1. As a result, the test was terminated. On the other hand, in Samples 2–6 within the scope of the present invention, the front end surfaces 51 of the plugs 50 were separate from the inlet-side opening ends 12 of the cells, and a catalyst was carried on the plugs 50 and their upstream partition wall portions 31. Accordingly, when unburned fuel was injected upstream of the plugs 50, particulates were not accumulated in the honeycomb filter on the exhaust gas inlet side. As a result of a durability test for a time period corresponding to 10,000-km driving, the evaluation of each Sample 2–6 was "pass."

In Samples 2–5, the distance X between the inlet-side opening end 12 of the honeycomb filter 1 and the front end surface 51 of the plug 50 was 0.7 times the entire length L of the honeycomb filter 1 or less. Accordingly, Samples 2–5 exhibited small initial pressure loss, and even after a durability test for a time period corresponding to 10,000-km driving, they exhibited as small pressure loss increase as less than 1.2, proving that they could withstand a long period of use.

EXAMPLE 2

Honeycomb filters 1 having the structure shown in FIG. 1 (Samples 7 and 8) were produced in the same manner as in Example 1. Each honeycomb filter 1 had a diameter of 267 mm and a length of 300 mm, and its partition walls 30 had a pitch of 1.5 mm, a thickness of 0.3 mm and a porosity of 65%. The distance X from the inlet-side opening end 12 of the honeycomb filter 1 to the front end surface 51 of the plug 50 was 49.8 mm (Sample 7) and 96.3 mm (Sample 8), respectively.

In each Sample 7, 8, the surfaces and pores of the plugs 50 and the downstream partition wall portions 32 carried a catalyst comprising Pt, cerium oxide and activated alumina. The amount of Pt in the catalyst carried was 1 g/L. A catalyst (Pt: 4 g/L) having a higher Pt concentration than the above catalyst was carried on the surfaces and pores of the partition wall portions 31 upstream of the plugs 50.

The durability test of each of the resultant ceramic honeycomb filters 1 was carried out in the same manner as in Example 1. Calculated from the pressure loss and initial pressure loss of the honeycomb filter 1 after the elapse of a time period corresponding to 10,000-km driving was a pressure loss ratio [(pressure loss after the elapse of a time period corresponding to 10,000-km driving)/(initial pressure loss)]. The results are shown in Table 2.

TABLE 2

| Sample No. | X (mm) | X/L | Pressure Loss Ratio | Evaluation |
|---|---|---|---|---|
| 7 | 49.8 | 0.17 | 1.09 | Pass |
| 8 | 96.3 | 0.32 | 1.05 | Pass |

In the ceramic honeycomb filters 1 of Samples 7 and 8, the front end surfaces 51 of the inlet-side plugs 50 were positioned downstream of the inlet-side opening end 12 of the filter, with a catalyst carried on the plugs 50 and the partition wall portions 31 between the inlet-side opening end 12 and the front end surface 51 of the plug 50. The catalyst on the exhaust gas inlet side had a larger Pt content. Accordingly, the catalyst on the exhaust gas inlet side exhibited higher activity than the catalyst on the exhaust gas outlet side. In the durability test of Samples 7 and 8 for a time period corresponding to 10,000-km driving, the evaluation of their durability was "pass," and the pressure loss ratio was lower than those of Sample 2 and 3. Accordingly, it was confirmed that the ceramic honeycomb filters 1 of Samples 7 and 8 could be used for a long period of time.

EXAMPLE 3

Honeycomb filters 1 of Samples 9 and 10 each having the structure shown in FIG. 1 were produced in the same manner as in Example 1. Each honeycomb filter 1 had a diameter of 267 mm and a length of 300 mm, and its partition walls 30 had a pitch of 1.5 mm, a thickness of 0.3 mm and a porosity of 65%. In the honeycomb filter 1, the distance X from the inlet-side opening end 12 to the front end surface 51 of the plug 50 was 49.8 mm (Sample 9) and 96.3 mm (Sample 10).

In each Sample 9, 10, a catalyst 1 comprising Pt, cerium oxide and activated alumina was carried on the surfaces and pores of the partition wall portions 31 upstream of the plugs 50. Thereafter, a catalyst containing lanthanum, cesium and vanadium was carried on the surfaces and pores of the plugs 50 and the downstream partition wall portions 32. This indicated that the catalyst carried on the partition wall portions 31 upstream of the inlet-side plugs 50 had higher activity than the catalyst carried on the downstream partition wall portions 32.

Each of the resultant ceramic honeycomb filters 1 (Samples 9, 10) was subjected to a durability test in the same manner as in Example 1. Calculated from the initial pressure loss of the honeycomb filter 1 and its pressure loss after the elapse of a time period corresponding to 10,000-km driving was a pressure loss ratio [(pressure loss after the elapse of a time period corresponding to 10,000-km driving)/(initial pressure loss)]. The results are shown in Table 3.

TABLE 3

| Sample No. | X (mm) | X/L | Pressure Loss Ratio | Evaluation |
|---|---|---|---|---|
| 9 | 49.8 | 0.17 | 1.07 | Pass |
| 10 | 96.3 | 0.32 | 1.04 | Pass |

In the ceramic honeycomb filters 1 of Samples 9 and 10, the front end surfaces 51 of the inlet-side plugs 50 were positioned downstream of the inlet-side opening ends 12 of the filter cells, the plugs 50 and the partition wall portions 31 upstream thereof carried a catalyst comprising Pt, cerium oxide and activated alumina, and the partition wall portions 32 downstream of the plugs 50 carried a catalyst comprising lanthanum, cesium and vanadium. Accordingly, the catalyst upstream of the plugs 50 had higher activity than the downstream catalyst. As a result, in the durability test of Samples 9 and 10 for a time period corresponding to 10,000-km driving, the evaluation of their durability was "pass," with smaller pressure loss ratios than those of Samples 2 and 3. It was thus confirmed that the ceramic honeycomb filters of Samples 9 and 10 could be used for a long period of time.

As described above in detail, in the ceramic honeycomb filter of the present invention for continuously burning particulates in the exhaust gas by the action of a catalyst, the front end surfaces of the inlet-side plugs are positioned downstream of the inlet-side opening ends of the filter cells. Thus, when a fuel and/or hydrocarbon in an unburned gas state is injected into a filter region upstream of the plugs, presuming the amount of particulates accumulated in the filter depending on the operation conditions of diesel engines, particulates are easily burned and less likely accumulated in the honeycomb filter. Therefore, the ceramic honeycomb filter of the present invention can clean an exhaust gas stably with small pressure loss for a long period of time without breakage and melting.

What is claimed is:

1. A ceramic honeycomb filter comprising a ceramic honeycomb structure having porous partition walls defining a plurality of flow paths which have an exhaust gas inlet side with an exhaust gas inlet opening and an exhaust gas outlet side with an exhaust gas outlet opening, wit plugs inside the flow paths such that an exhaust gas passes through pores of the porous partition walls, thereby removing particulates from the exhaust gas; a catalyst being carried at least partially on the partition walls, on the plugs or on the partition walls and the plugs; wherein a plurality of the plugs at the exhaust gas inlet side are disposed at a position separate from the exhaust gas inlet opening of the flow paths, where the plugs so disposed have a front end surface which faces the exhaust gas inlet opening, at a position at which the temperature will be elevated substantially equal to or higher than the lowest activation temperature of the catalyst at least for a certain period of time during operation of an internal combustion engine, wherein of the total number of plugs at the exhaust gas inlet side 70% or more by number of the plugs at the exhaust gas inlet side are disposed at a position physically separate from the exhaust gas inlet opening of the flow paths along the direction of the flow paths, wherein front end surfaces of the inlet-side plugs are positioned in a region of 0.7 times the entire length of to ceramic honeycomb filter or less from an exhaust gas inlet-side opening end of the ceramic honeycomb filter.

2. The ceramic honeycomb filter according to claim 1, wherein the partition walls have a constant thickness over the length of the flow paths.

3. The ceramic honeycomb filter according to claim 1, wherein to partition walls have a thickness of 0.1–0.5 mm and a pitch of 1.3 mm or more.

4. The ceramic honeycomb filter according to claim 1, wherein the exhaust gas passes through at least pores of porous partition walls existing between the inlet-side opening ends of said flow paths and plugs separate therefrom.

5. The ceramic honeycomb filter according to claim 4, wherein a porosity of the partition walls is 50–80%.

6. The ceramic honeycomb filter according to claim 1, wherein a porosity of the partition walls is 50–80%.

7. The ceramic honeycomb filter according to claim 6, wherein a porosity of the plugs is higher than or equal to the porosity of said partition walls.

8. The ceramic honeycomb filter according to claim 1, wherein both ends of flow paths near an outer wall of the ceramic honeycomb filter are plugged, thereby preventing heat in the ceramic honeycomb filter from escaping outside via the outer wall.

9. The ceramic honeycomb filter according to claim 1, wherein the front end surfaces of the plugs disposed at a position separate from to exhaust gas inlet opening of the flow path are positioned in a range from 0.1 times to 0.4 times the entire length L of the ceramic honeycomb filter from the inlet-side opening end of the ceramic honeycomb filter.

10. The ceramic honeycomb filter according to claim 1, wherein the plurality of the plugs at the exhaust gas inlet side have a surface facing the exhaust gas inlet openings, and the plurality of the plugs facing the exhaust gas inlet openings are disposed at a position separate from the inlet side openings of the flow paths and at least a portion of the plugs disposed at a position separate from the exhaust gas inlet opening of the flow path is disposed at different distances along the entire length of the ceramic honeycomb filter.

11. The ceramic honeycomb filter according to claim 10, wherein the ceramic honeycomb filter is cordierite formed from a starting material powder having a composition, by mass, comprising 47–53% $SiO_2$, 32–38% $Al_2O_3$ and 12–16% MgO as main components.

12. The ceramic honeycomb filter according to claim 1, wherein the plurality of the plugs at the exhaust gas inlet side disposed at a position separate from the exhaust gas inlet opening of the flow paths have a front end surface facing the exhaust gas inlet opening, and the catalyst is carried on the plugs so disposed and on the partition wall between the exhaust gas inlet opening and the front surface of the disposed plugs.

13. The ceramic honeycomb filter according to claim 1, wherein the plurality of the plugs at the exhaust gas inlet side disposed at a position separate from the exhaust gas inlet opening of the flow path are porous, and the pores of the plugs carry a catalyst and further the portion of the porous partition wall between the plugs so disposed and the exhaust gas outlet opening carries a catalyst.

14. The ceramic honeycomb filter according to claim 1, wherein the plugs so disposed and the partition wall portions between the plugs so disposed and the exhaust gas inlet side opening carry a first catalyst and the partition wall portions between the plugs so disposed and the exhaust gas outlet opening carry a second catalyst, wherein the first catalyst has higher activity than the second catalyst.

15. The ceramic honeycomb filter according to claim 1, wherein the catalyst comprises at least a platinum-group metal.

16. The ceramic honeycomb filter according to claim 15, wherein the catalyst comprising at least the platinum group metal is carried on partition walls and wherein the content of the platinum group metal is higher in the catalyst carried on partition walls on the exhaust gas inlet side than in the catalyst carried on the exhaust gas outlet end partition wall portions.

17. The ceramic honeycomb filter according to claim 1, wherein the catalyst comprising at least the platinum group metal is carried on partition walls and wherein the content of the platinum group metal is higher in the catalyst carried on partition walls on the exhaust gas inlet side than in the catalyst carried on the exhaust gas outlet end partition wall portions.

18. The ceramic honeycomb filter according to claim 1, wherein the catalyst is carried at least partially on the partition walls and also at least partially on the plugs.

19. The ceramic honeycomb filter according to claim 1, wherein a catalyst carried on partition wall portions on the exhaust gas inlet side is higher in activity than a catalyst carried on the exhaust gas outlet end partition wall portions.

20. A method for removing particulates from an exhaust gas by passing the exhaust gas through a ceramic honeycomb filter comprising a ceramic honeycomb structure having porous partition walls defining a plurality of flow paths which have an exhaust gas inlet side with an exhaust gas inlet opening and an exhaust gas outlet side with an exhaust gas outlet opening, with plugs inside the flow paths such that an exhaust gas passes through pores of the porous partition walls, thereby removing particulates from the exhaust gas; a catalyst being carried at least partially on the partition walls, on the plugs or on the partition wails and the plugs; wherein a plurality of the plugs at the exhaust gas inlet side are disposed at a position separate from the exhaust gas inlet opening of the flow paths, where the plugs so disposed have a front end surface which faces the exhaust gas inlet opening, at a position at which the temperature will be elevated substantially equal to or higher than the lowest activation temperature of the catalyst at least for a certain period of time during operation of an internal combustion engine, wherein of the total number of plugs at the exhaust gas inlet side 70% or more by number of the plugs at the exhaust gas inlet side are disposed at a position physically separate from the exhaust gas inlet opening of the flow paths along the direction of the flow paths, wherein front end surfaces of the inlet-side plugs are positioned in a region of 0.7 times the entire length of the ceramic honeycomb filter or less from an exhaust gas inlet-side opening end of the ceramic honeycomb filter, wherein in the method particulates from the exhaust gas which have built up on the porous partition walls during the removing of the particulates from the exhaust gas arc burned in the ceramic honeycomb filter by the action of the catalyst to avoid a pressure drop increase due to the accumulation of the particulates, which method comprises injecting unburned fuel and/or hydrocarbon in a gaseous state upstream of the plugs disposed at a position separate from the exhaust gas inlet opening to maintain at least part of the plugs disposed at a position separate from the gas inlet opening and regions downstream of the plugs disposed at a position separate from the gas inlet opening at a temperature substantially equal to or higher than the lowest activation temperature of the catalyst, wherein a temperature profile is maintained along the length of the ceramic honeycomb filter from the exhaust gas inlet opening to the exhaust gas outlet opening where temperature rapidly increases from a first temperature at the exhaust gas inlet opening to a second higher temperature at the plugs disposed at a position separate from the gas inlet opening and then the temperature is maintained at a relatively constant higher temperature to the exhaust gas outlet opening.

21. The method for removing particulates according to claim 20, wherein said unburned fuel and/or hydrocarbon is injected in a gaseous state to elevate a temperature in the plugs disposed at a position separate from the exhaust gas inlet opening and their downstream region in said honeycomb filter to 600° C. or higher, at which the self-burning of the particulates occurs.

22. The method for removing particulates according to claim 20, wherein said catalyst comprises at least a platinum-group metal.

23. The method for removing particulates according to claim 22, wherein said catalyst comprises a platinum-group metal and alkaline earth metal oxides, rare earth oxides, or base metal catalysts.

24. The method for removing particulates according to claim 23, wherein said platinum-group metal in the catalyst is at least one metal selected the group consisting of Pt, Pd, Ru and Rh.

25. The method for removing particulates according to claim 20, wherein the content of a platinum-group metal is higher in the catalyst carried on partition wall portions on the exhaust gas inlet side than in the catalyst carried on the exhaust gas outlet end partition wall portions.

\* \* \* \* \*